(12) United States Patent
Casey et al.

(10) Patent No.: US 10,757,475 B2
(45) Date of Patent: Aug. 25, 2020

(54) SYSTEM AND METHOD FOR UTILIZING SET-TOP BOX TESTING IN TELEVISION DISTRIBUTION NETWORK

(71) Applicant: CenturyLink Intellectual Property LLC, Denver, CO (US)

(72) Inventors: Steven M. Casey, Littleton, CO (US); Felipe Castro, Erie, CO (US); Misbah ur Rehman, Highlands Ranch, CO (US); Ronnie S. Dhaliwal, Centennial, CO (US)

(73) Assignee: CENTURYLINK INTELLECTUAL PROPERTY LLC, Denver, CO (US)

(*) Notice: Subject to any disclaimer, the term of this patent is extended or adjusted under 35 U.S.C. 154(b) by 872 days.

(21) Appl. No.: 13/724,587

(22) Filed: Dec. 21, 2012

(65) Prior Publication Data

US 2014/0181849 A1    Jun. 26, 2014

(51) Int. Cl.
| | |
|---|---|
| *H04N 21/442* | (2011.01) |
| *H04N 21/81* | (2011.01) |
| *H04N 21/6543* | (2011.01) |
| *H04N 21/658* | (2011.01) |
| *H04N 21/24* | (2011.01) |
| *H04N 21/262* | (2011.01) |

(52) U.S. Cl.
CPC ......... *H04N 21/442* (2013.01); *H04N 21/24* (2013.01); *H04N 21/26291* (2013.01); *H04N 21/658* (2013.01); *H04N 21/6543* (2013.01); *H04N 21/818* (2013.01); *H04N 21/8173* (2013.01); *H04N 21/8193* (2013.01)

(58) Field of Classification Search
CPC ....... H04L 12/2801; H04L 12/12; H04L 1/24; H04N 21/435; H04N 21/235; H04N 21/4331; H04N 21/443; H04N 21/2221; H04N 21/25833; H04N 21/4516; H04N 21/262; H04N 21/26291; H04N 21/442
USPC ......... 709/224; 370/254; 725/110, 139, 129, 725/109, 107, 14
See application file for complete search history.

(56) References Cited

U.S. PATENT DOCUMENTS

| | | | |
|---|---|---|---|
| 8,544,034 B2* | 9/2013 | Pham | 725/13 |
| 8,938,748 B1* | 1/2015 | Mirisola | H04H 60/32 725/10 |
| 2003/0090515 A1* | 5/2003 | Chang | H04N 5/4401 715/745 |
| 2004/0093370 A1* | 5/2004 | Blair et al. | 709/200 |
| 2005/0114879 A1* | 5/2005 | Kamieniecki | H04N 7/17318 725/15 |
| 2005/0157215 A1* | 7/2005 | Minnick et al. | 348/725 |
| 2006/0271971 A1* | 11/2006 | Drazin | H04N 7/17318 725/86 |
| 2007/0050836 A1* | 3/2007 | Stanek et al. | 725/131 |

(Continued)

FOREIGN PATENT DOCUMENTS

| | | | | |
|---|---|---|---|---|
| KR | 2006019893 | * | 3/2006 | G06F 15/16 |
| WO | WO-0205560 A2 | * | 1/2002 | H04N 21/235 |
| WO | WO-2012165947 A1 | * | 12/2012 | G06F 8/65 |

*Primary Examiner* — Alfonso Castro

(57) ABSTRACT

Novel tools and techniques to enable data to be tested on subscriber set-top boxes. Some solutions can connect a sever with a group of subscriber set-top boxes through a television distribution network. In some cases, a plurality of set-top boxes are selected, and at least one set-top box is determined to be inactive. In some cases, data are loaded and tested on the inactive set-top.

18 Claims, 5 Drawing Sheets

(56) References Cited

U.S. PATENT DOCUMENTS

| | | | |
|---|---|---|---|
| 2007/0058043 A1* | 3/2007 | Thukral | H04N 17/004 348/180 |
| 2007/0162905 A1* | 7/2007 | Kooijmans | G06F 8/65 717/173 |
| 2007/0192763 A1* | 8/2007 | Helvick | G06F 8/65 717/168 |
| 2007/0294362 A1* | 12/2007 | Patel | 709/217 |
| 2007/0300273 A1* | 12/2007 | Turner | G06Q 30/02 725/105 |
| 2008/0281926 A1* | 11/2008 | Walter | H04N 7/163 709/206 |
| 2008/0301751 A1* | 12/2008 | Naito | H04N 21/4334 725/139 |
| 2009/0055862 A1* | 2/2009 | Knoller | G06Q 30/02 725/34 |
| 2009/0122879 A1* | 5/2009 | Howe et al. | 375/240.27 |
| 2010/0115254 A1* | 5/2010 | Deng et al. | 713/1 |
| 2011/0055889 A1* | 3/2011 | Neill | 725/132 |
| 2011/0209180 A1* | 8/2011 | Ellis et al. | 725/42 |
| 2011/0252337 A1* | 10/2011 | Pignataro | H04L 51/04 715/748 |
| 2012/0054785 A1* | 3/2012 | Yang et al. | 725/16 |
| 2013/0054703 A1* | 2/2013 | Neill et al. | 709/206 |
| 2013/0174191 A1* | 7/2013 | Thompson, Jr. | G06Q 30/0207 725/23 |

* cited by examiner

SYSTEM AND METHOD FOR UTILIZING SET-TOP BOX TESTING IN TELEVISION DISTRIBUTION NETWORK

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to set-top box testing, and more particularly, to set-top box testing utilizing subscriber set-top boxes.

BACKGROUND

With the increase in pay television services, set-top boxes became popular, as an interface between a cable or satellite television network and a subscriber's television. With the advent of digital television, the importance of set-top boxes remains high, and television providers strive to maintain leading-edge features in the set-top boxes they provide to subscribers. In fact, advanced set-top box functionality can provide a competitive advantage for a television provider. Accordingly, many television providers supply subscribers with upgradeable set-top boxes, which can be reprogrammed and/or updated as the provider develops new features or fixes bugs in the set-top box software.

Such updates cannot be provided until they have been thoroughly tested, however. Typically, software is first tested in set-top boxes installed in a lab. This technique, however, requires a large number of set-top boxes installed in a lab, and the great variety in hardware models and software levels in deployed set-top boxes only exacerbates this problem, as a provider must maintain a huge inventory of test boxes to ensure that software updates will not break some models. At any given time, however, there are a vast number of inactive production set-top boxes installed at subscriber premises. (As used herein, the term "inactive," as applied to a set-top box, means a set-top box that is not currently engaged in providing services to a subscriber. Such an inactive set-top box might be in a sleep state, powered off, or powered on). It would be useful to be able to employ such inactive set-top boxes for testing purposes. Currently, however no facility exists to support such features.

BRIEF SUMMARY

A set of embodiments provides tools and techniques to enable data testing on subscriber set-top boxes connected through a television distribution network, which can include without limitations, cable television network, satellite television networks, Internet Protocol television systems, terrestrial broadcast television systems, and/or the like. Such embodiments can allow new software (e.g., firmware, operating systems, applications, etc.) to be tested on set-top boxes in a production environment. Using such techniques, a provider can have access to a large number and/or variety of test platforms with the need to maintain an expensive lab with suitable test equipment. In an aspect, some systems allow testing to be performed without affecting the apparent functionality of the set-top boxes or otherwise negatively impacting the subscriber experience.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments features methods of testing data on subscriber set-top. An exemplary method might comprise connecting a server with a group of subscriber set-top boxes through a television distribution network. In some aspects, a plurality of set-top boxes is selected from the group of set-top boxes. In other aspects, one of the selected set-top boxes is determined to be inactive. In some embodiments, the method might further comprise loading data on the inactive set-top box. In some aspects, such data might comprise an executable program. The method, then, might include testing the data on the inactive set-top box. In some embodiments, the method further comprises removing the data from the inactive set-top box when the test is completed and/or restoring the set-top box to its pre-test configuration. In an aspect, the method can include recording a test result.

An apparatus provided by other embodiments might comprise a non-transitory computer readable medium having encoded thereon a set of instructions executable by one or more computer to perform one or more operations, including without limitation instructions for performing methods (or portions thereof) provided by other embodiments.

Merely by way of example, in one embodiment, the set of instructions might comprise instructions to connect with a group of subscriber set-top boxes through a television distribution network. The set of instructions might further comprise instructions to select a plurality of set-top boxes from the group of set-top boxes, and/or instructions to determine at least one of the selected set-top boxes is inactive. In some cases, the set of instructions could also include instructions to load data on the inactive set-top box, instructions to test the data on the inactive set-top box, instructions to remove the data from the inactive set-top box when the test is completed, and/or instructions to record the test result.

A computer system provided by other embodiments might comprise one or more processors, a non-transitory computer readable medium in communication with the one or more processors, the computer readable medium having encoded thereon software executable by the computer system to perform one or more operations. In some cases, the software might comprise a set of instructions, such as those described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
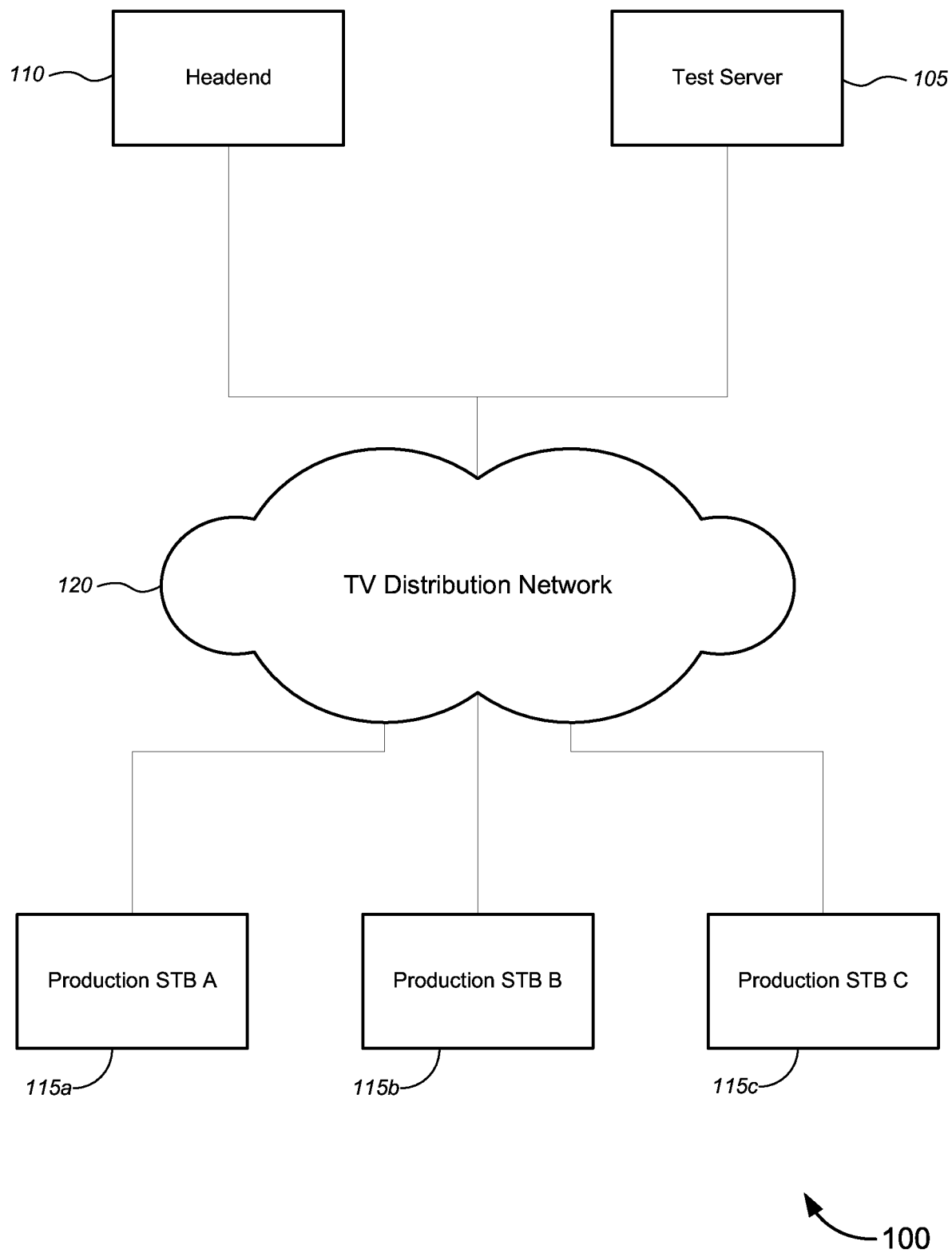
FIGS. 1A-1C are block diagrams illustrating systems for testing data on subscriber set-top boxes, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments provides tools and techniques to enable data testing on subscriber set-top boxes connected through a television distribution network, which can include without limitations, cable television network, satellite television networks, Internet Protocol television systems, terrestrial broadcast television systems, and/or the like. Such embodiments can allow new software (e.g., firmware, operating systems, applications, etc.) to be tested on set-top boxes in a production environment, i.e., set-top boxes that are installed in subscribers' premises and available for subscribers to use for normal television viewing (referred to herein as "production set-top boxes" or "subscriber set top boxes"). Using such techniques, a provider can have access to a large number and/or variety of test platforms (in the form of production set-top boxes) with the need to maintain an expensive lab with suitable test equipment. In an aspect, some systems allow testing to be performed without affecting the apparent functionality of the production set-top boxes or otherwise negatively impacting the subscriber experience.

Merely by way of example, some embodiments can include systems, methods, software, tools and techniques that enlist inactive subscriber set-top boxes in a television distribution system to test an executable program, which can be any type of software, firmware, or the like, that is executable on a set-top box, including without limitation firmware patches, operating systems, applications, feature enhancements, and/or the like. Such distribution systems vary widely in different embodiments and can include, without limitation, cable television systems, satellite television systems, Internet Protocol television systems, terrestrial broadcast television systems, and/or the like. Accordingly, various embodiments can be used in a wide variety of broadcast, multicast and/or unicast environments.

Various embodiments offer different ways to enable such testing. Merely by way of example, in some cases, the system might employ a boot loader on a production set-top box to load a new operating system while still allowing reversion to the pre-existing operating system on the set-top box at the conclusion of testing. Other embodiments might load an application for testing on the pre-existing operating system. In any such case, the new software can be downloaded from a central server operated by the provider, e.g., using the television distribution network normally used to distribute television signals to the set-top boxes and/or via any other appropriate data connection.

Turing now to the figures, FIG. 1A illustrates a system 100 in accordance with one set of embodiments. The system 100 generally comprises a test server 105, a television distribution system headend 110, and a plurality of production set-top boxes 115 in communication with the test server 105 and/or the headend 110 via a television distribution network 120. The system 100 is depicted functionally and can be implemented using a variety of hardware arrangements. Merely by way of example, in some cases, the test server 105 might be implemented on a single computer (an exemplary architecture for which is described below), as a plurality of computers, etc. Similarly, the functionality of the test server 105 might be incorporated in the headend 110, and/or the like. More generally, the functionality attributed to the test server 105 and/or other system components can be distributed and/or aggregated as appropriate in different embodiments. By the same token, the functions ascribed herein to various components of the system 100 can be arranged differently; for instance, the functions ascribed to a plurality of components might be performed by a single component, and/or the functions ascribed to a single component might be performed by a plurality of components in other embodiments. In a particular aspect, however, the test server 105 (in whatever form) comprises a computing device that is programmed with instructions to perform the testing methodologies described herein.

Referring to FIG. 1A, the television distribution system headend 110 can be any device or collection of devices that is capable of providing television and/or video services over the distribution network 125 to the set top boxes 115, in any suitable manner known to those skilled in the art. In an aspect, the headend 110 can transmit video, software, and/or application to subscriber set-top boxes 115 through television distribution network 120. The nature of the television distribution network 125 can vary depending on the type of distribution. Merely by way of example, the television distribution network 120 might comprise a data network, such as the Internet, an Internet service provider's access network and/or a telecommunication provider's access network. Alternatively and/or additionally, the television distribution network 120 might comprise a cable television network, a satellite television network, a terrestrial broadcast television network, and/or the like. Any communication technology that is capable of providing television, video, and/or data from the headend 110 to the set top boxes 115 can be employed as the television distribution network 120.

Similarly, a variety of different types of set-top boxes 115 can be employed by different embodiments. In a typical scenario, a set-top box will have a communication interface that is compatible with the television distribution network 120 (e.g., in a cable television network, the set-top box 115 will have an RG58 (or similar) interface to communicate over the cable distribution network, while other embodiments might employ Ethernet interfaces, twisted pair interfaces, and/or any other standard or proprietary interface for communicating with the headend 110 and/or the test server 105 over the television distribution network 120 (and/or, as noted below, over a different communication facility). A typical set-top box 115 will also include a processor and other related hardware to execute programs for providing typical set-top box functionality (such as channel navigation, interactive features, and/or the like). As such, a set-top box 115, in some aspects, can be considered a computing device, an exemplary architecture for which is described in detail below.

In operation, the headend 110 will distribute video signals (e.g., television programming) to a plurality (and usually a great number) of set-top boxes 115 located at premises of the subscribers to the television service provided by the operator of the headend. The test server 105 can also communicate with some or all of those set-top boxes 115 to perform the testing operations described herein. Thus, in an aspect, the television distribution network 120 can be used to distribute a wide range of data packages to subscriber set-top boxes 115. Exemplary data packages can include a software update (e.g., operating system, applications, firmware updates, etc.), a VOD lead-in, an encryption key, an advertisement for insertion, a program guide, and/or the like, and such data packages can be provided by the test server 105 to be tested, as described below, on one or more of the subscriber set-top boxes 115.

Figure 1B:
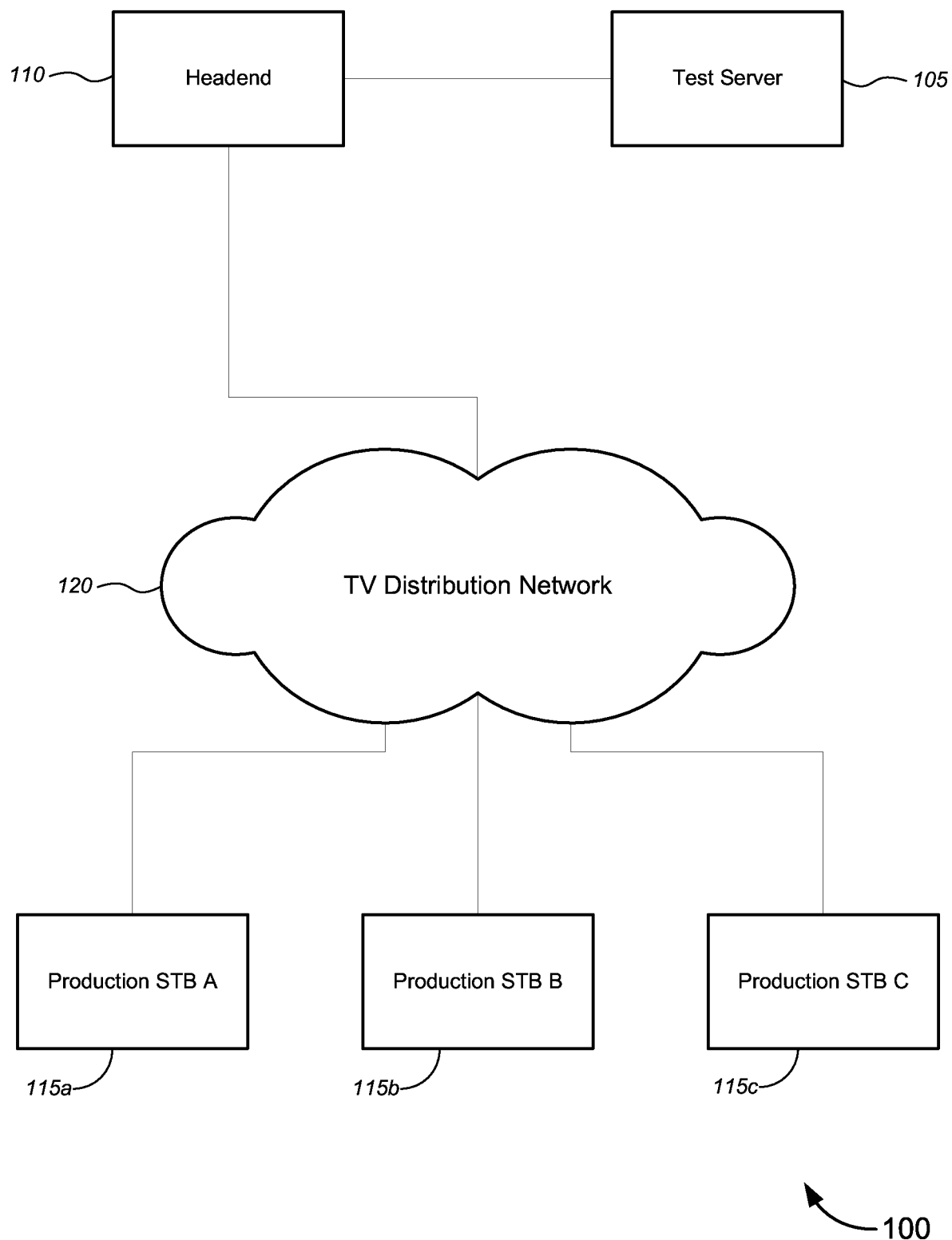
Figure 1C:
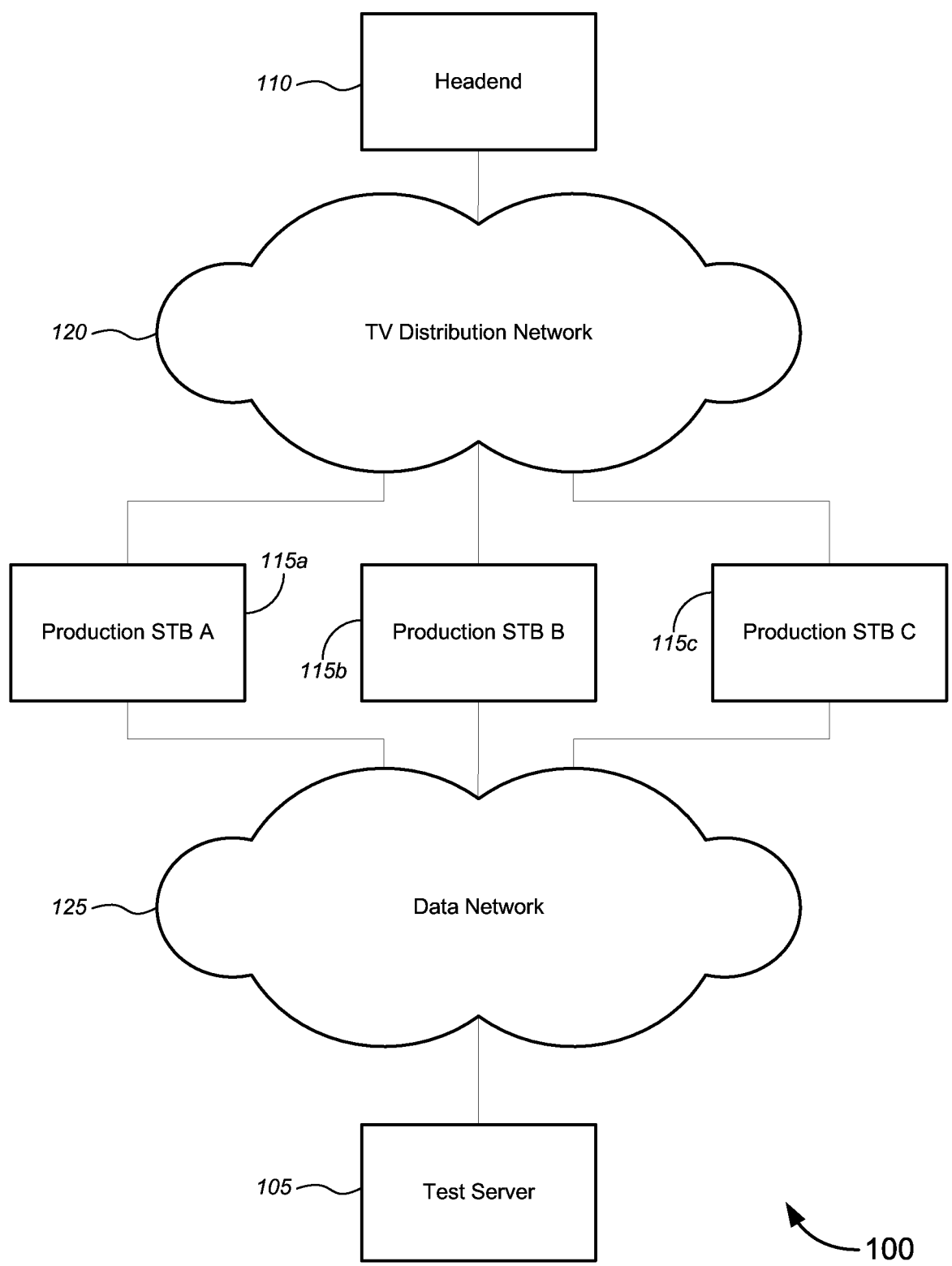

In one aspect, as noted above, the test server 105 might communicate directly with the set-top boxes 115 over the television distribution network 120, and this arrangement is illustrated by FIG. 1A. Other arrangements are possible as well, however. Merely by way of example, in some cases, as illustrated by FIG. 1B, the test server 105 might communicate with the headend 110, which can serve as an intermediary between the set-top boxes 115 and the test server 105 (e.g., to forward software for testing and/or other data (such as testing instructions) from the test server 105 to the set-top boxes 115 and/or forwarding data (such as test results) from the set-top boxes 115 to the server 105. (Alternatively, as noted above, the functionality of the test server 105 and the headend 110 can be combined into a single platform). In other embodiments, as illustrated by FIG. 1C, the test server 105 might communicate with the set-top boxes 115 over a different medium than the television distribution network, such as, for example, a data network 125 (which could be any type of network, such as the access networks described above, the Internet, and/or any other public or private network that can provide sufficient communication capabilities between the test server 105 and the set-top boxes 115). Based on these examples, the skilled reader should understand that a variety of different communication architectures are possible in accordance with various embodiments.

Through whatever communication facilities are provided, test server 105 can be connected with a group of subscriber set-top boxes 115, which can allow the test server 105 to provide a wide range of data to subscriber set-top boxes 115 and to receive test result from subscriber set-top boxes. In one aspect, the test server 105 might select a plurality of set-top boxes 115 from a large group of set-top boxes (e.g., set-top boxes associated with all or a substantial portion of the provider's subscribers) according to various criteria, which may include user profile (including, for example, whether a particular subscriber has opted into—or out of—testing on his or her set-top box), geographic region, set-top box usage profile, set-top box hardware model, set-top box software version, network connection, and/or combinations thereof. Merely by way of example, the test server 105 might select a variety of set-top boxes with different hardware configurations and/or software versions to ensure that a new software package will work across all (or at least a portion of) the set-top boxes deployed to subscribers. As another example, the test server 105 might select only set-top boxes in a particular region (e.g., portion of a state) for testing a software package that the provider plans to pilot in that region.

In one aspect, the test server 105 might poll the set-top boxes 115 to determine whether those set-top boxes have characteristics (e.g., hardware and/or software configuration, location, usage profile, etc.) satisfy criteria for serving as a test platform, and the set-top boxes might store such information and provide it to the server 105 upon request. In another aspect, the test server 105 might store profile data about each set-top box 115 (based, e.g., on prior polling, data input through some other method, and/or the like) and might compare the stored profile data against the testing criteria for a particular test. In some cases, one criterion for determining whether a particular set-top box 115 should be used for testing is whether that box is currently active (e.g., displaying video for a subscriber); the test server 105 might not select any active set-top boxes 115 so as to avoid disturbing subscriber activities. Alternatively and/or additionally, the test server 105 might select set-top boxes 115 for testing without regard to whether those boxes 115 are active but might poll each set-top box 115 for activity before beginning testing (and not begin testing a particular box 115 until that box is inactive).

The test server might then provide data to one or more of the selected set top boxes 115; at least some of the data might be provided for testing on the set-top boxes 115. The data may comprise an executable program, and may further include a software update, an application, an operating system, and/or a video clip (e.g., a clip explaining to the user that the box is being tested and that normal functionality will resume shortly, in case the subscriber tries to activate the box during testing). The data might further comprise a manifest, test script, and/or other instructions that the set-top box must follow to perform the testing. Performing the testing might comprise loading new software on to the box and/or executing that software, which might involve a change in functionality of a set-top box, and/or a change to a graphical user interface. In another aspect, the data might be removed from the set-top box when the test is completed. Alternatively and/or additionally, the set-top box 115 might communicate with the test server 105 to indicate a status of testing, results of testing, any interruption in testing (for instance, if a subscriber activates the box 115 during the test procedure).

Figure 2:
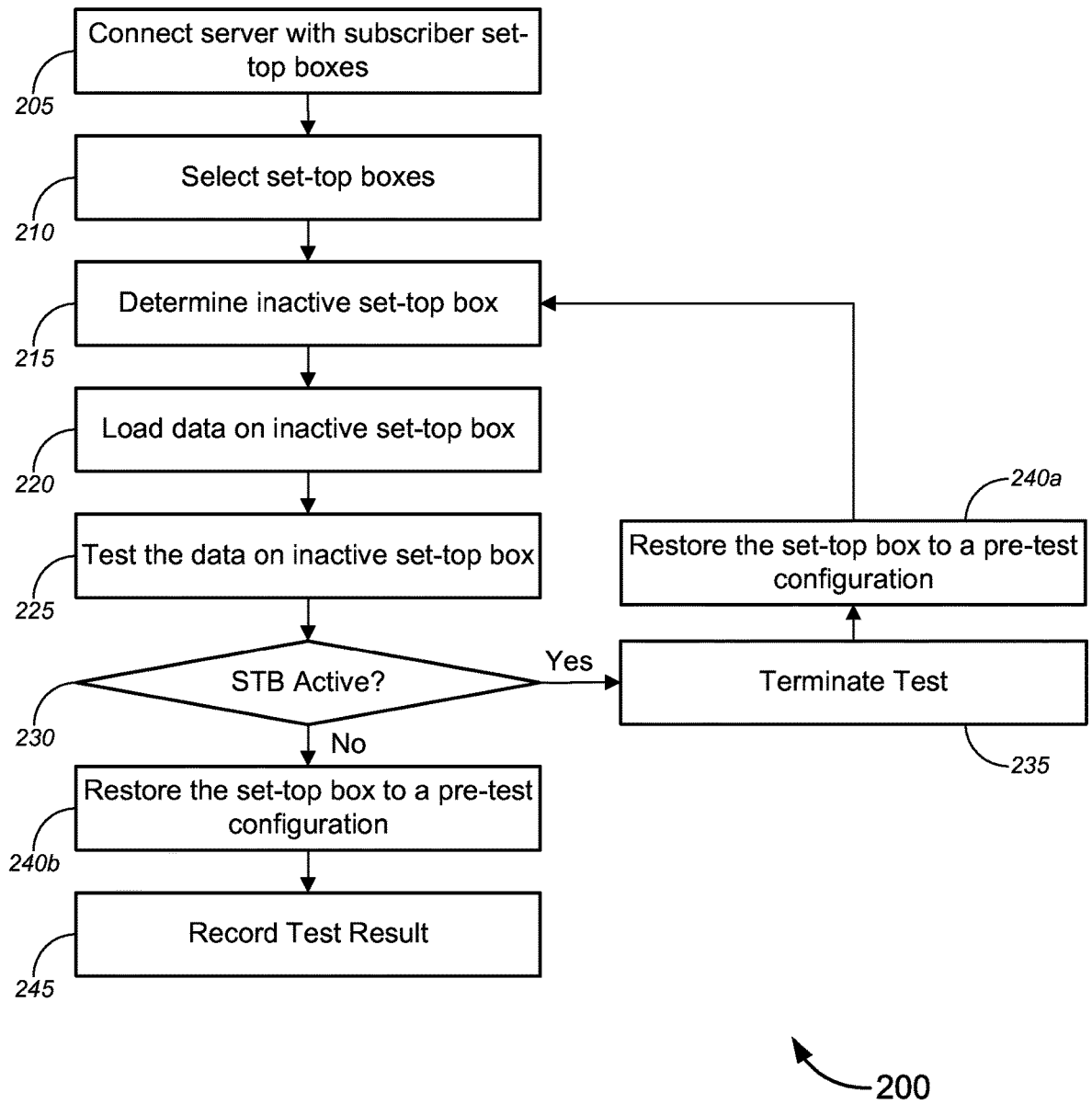
FIG. 2 is a process flow diagram illustrating a method of testing data on subscriber set-top boxes, in accordance with various embodiments.

FIG. 2 illustrates a method that can be used to utilize subscriber set-top boxes to test data. While the techniques and procedures of FIG. 2 are depicted and/or described in a certain order for purposes of illustration, it should be appreciated that certain procedures may be reordered and/or omitted within the scope of various embodiments. Moreover, while the method illustrated by FIG. 2 (and/or various operations thereof) can be implemented by (and, in some cases, are described below with respect to) the systems of FIGS. 1A-1C (or components thereof), these methods may also be implemented using any suitable hardware implementation. Similarly, while the systems of FIGS. 1A-1C (and/or components thereof) can operate according to the method illustrated in FIG. 2 (e.g., by executing instructions embodied on a computer readable medium), the system can also operate according to other modes of operation and/or perform other suitable procedures.

The method 200 comprises, in an embodiment, connecting one or more servers with a group of subscriber set-top boxes through a television distribution network (block 205).

In some embodiments, as shown by block 210, the method comprises selecting one or more set-top boxes from the group of set-top boxes to which the servers are connected. In some embodiments, this selection may be performed according to various criteria, including without limitation those criteria discussed above. For example, if the software to be tested only runs on a particular model of set top box, the server might select only set-top boxes of that hardware model. In another example, the selection may be in part based on network speed and/or lag associated with the set-top box. In another example, the selection may be in part usage profiles of the set-top boxes; for instance, the server might select only set-top boxes with a usage profile indicating that the set-top box is rarely active during the time of day and/or day of the week at which the testing will be performed. In another example, the selection may be in part based on available memory on set-top boxes. In some cases, a subscriber may be given the option to authorize testing data on the subscriber' set top box, and the testing criteria might specify selecting only set-top boxes authorized by subscribers for testing. (In other cases, however, set-top boxes may be selected without subscriber's input or knowledge.) Based on these examples, one skilled in the art should appreciate that any number of different criteria can be employed to select boxes for testing, and that various criteria can be combined to arrive at a precise selection of set-top boxes for testing. As noted above, the characteristics of the set-top boxes, against which the criteria are applied, can be stored in profiles on the test server (or a device accessible to the test server) and/or can be stored in the set-top boxes themselves and/or provided to the server, e.g., upon a polling request.

As noted above, it may not be desirable to test a set-top box while it is active (i.e., while a subscriber is using the box). Hence, at block 215, the method 200 might comprise determining that at least one of the selected set-top boxes is inactive. A variety of techniques can be performed to make this determination. Merely by way of example, the test server might query all of the set-top boxes that have been selected for a response from each set-top box indicating whether that set-top box is active. Alternatively and/or additionally, the server might be able to query the headend to determine the status of the selected boxes, if the headend has a way to track active set-top boxes (for example, by determining whether a video stream is currently being provided to the set-top box). As another alternative, set-top boxes might provide status updates periodically on their own initiative, and/or upon request, to the headend and/or to the test server.

In an aspect of some embodiments, the test server and/or the headend maintain a list of set-top boxes, which might be identifiable and/or addressable by an identifier (such as a hardware identifier, an IP address or the like). This identifier might be used as a key for a record in a database maintained at the test server (or another device). The record might include further details, such as the characteristics of the set-top box and/or the preferences of the subscriber with which the set-top box is associated, a usage profile of the set-top box, whether the set-top box is active at a current time, and/or the like). Such a database could be used by the test server both in selecting set-top boxes and/or in determining whether selected set-top boxes are inactive. (It should be noted as well, as mentioned above, that the determination of whether a set-top box is active might be used as a criterion in selecting a set-top box, so that these operations effectively might be the same operation.)

The remainder of FIG. 2 illustrates a series of procedures that can be implemented to perform testing at a single set top box. It should be appreciated, however, that these procedures can be implemented across any number of selected set-top boxes, sequentially and/or in parallel, depending on the goals for the software test. For example, in some cases, the developer might want to test the software on a single platform, so that only one set-top box need be utilized for testing, and the procedure need not be repeated for any additional set-top boxes unless and until the first set-top box becomes unavailable—e.g., active—before the testing is complete. As a different example, the developer might want to stress test a software package across a large number of platforms, in which case, the procedures below might be performed in parallel for a large number of set-top boxes.

At block 220, the method further comprises loading data onto an inactive set-top box. In one aspect, as noted above, the data might comprises an executable program, such as an operating system, an application, or the like, and/or the data might include an incremental update to an executable program that already exists on the set-top box. (In this document, either an entire executable program or an incremental update that modifies an existing executable program can be considered an executable program for testing purposes.) The data may further comprise associated information, such as a manifest, test instructions for the set-top box, a video clip, and/or the like. In an aspect, loading the data might comprise transmitting the data from the test server to the set-top box, e.g., via a television distribution network and/or headend, via a separate data network, and/or the like. In another aspect, the set-top box might be configured to execute the data upon receipt, and/or loading the data might further comprise the test server instructing the set-top box to execute the data, to reboot (e.g., with a new operating system received from the test server), to store the data on a storage medium at the set-top box, and/or the like. In further embodiments, loading the data can include the set-top box performing these operations as instructed or as part of the set-top box's default configuration. In some cases, loading the data onto the set-top box might comprise archiving an existing version of an application so that an updated version can be installed in its place. Alternatively, the existing version might be left in place, and the operating system and/or application loader can be configured to open the new version of the application from a different location on the storage medium of the set-top box (and/or from RAM).

At block 225, the method further comprises testing the data on the inactive set-top box. As indicated above, in many cases, the data comprises one or more software programs, and testing the data can comprise executing the software program(s). The techniques for executing and/or testing a software program can vary. Merely by way of example, the data to be tested might comprise a new version of an operating system. In this case, the set-top box might be rebooted, and a bootloader might load the new version of the operating system. In some cases, the bootloader might be part of the loaded data; in other cases, the set-top box might have the bootloader pre-installed, and part of the loaded data might be instructions and/or configuration information to cause the bootloader to load the new version of the operating system. In any case, use of a bootloader can allow dual-booting of the pre-existing operating system on the set-top box and the new version provided by the test server, to allow the existing version of the operating system to remain intact. In other cases, the software program might be an application, in which case the test server might also load on the set-top box an application loader and/or instructions to execute the application.

The nature of the testing can vary depending on the program being tested, and there are a variety of test regimes known to those skilled in the art. Any of such regimes can be implemented by different embodiments. In fact, the testing of new software on production set-top boxes can be similar to other techniques of testing set-top box software or firmware, except that some embodiments can enable this testing to be performed on set-top boxes that are in production, rather than in a test lab.

Television providers typically attempt not to inconvenience their subscribers, and various embodiments provide several facilities to avoid such inconvenience. Merely by way of example, embodiments can allow a provider to schedule testing for times of little use (such as the early morning hours) and/or limit testing to particular time zones. Some embodiments can enhance this functionality by tracking set-top box usage patterns and allowing a set-top box to be selected for testing (and/or testing to be scheduled) at a time at which the usage profile indicates that the set-top box is most likely to be inactive. Nonetheless, there may be times when a previously-inactive set-top box that is currently testing a program will be activated (either by a subscriber, by a scheduled recording, and/or the like). Certain embodiments provide features that can minimize any inconvenience experienced by the subscriber as a result of the subscriber's attempt to activate a set-top box during testing.

Merely by way of example, if at any point during testing, the set-top box or the server detects that the set-top box has become active (or that a subscriber has attempted to activate the set-top box), as shown by block 230, the testing can be terminated (block 235). For instance, the activation of the set-top box might be detected based on detecting that the set-top box has received user input (e.g., from a remote control). Upon termination, the loaded program(s) or other data being tested can be removed from the set-top box, and the set-top box can be restored to its pre-test configuration (block 240a). Restoring the set-top box to its pre-test configuration can comprise many different operations. Merely by way of example, in some cases, restoring the set-top box might comprise removing a bootloader and/or an updated version of the operating system, or reconfiguring the bootloader to boot the pre-existing version of the operating system. Similarly, restoring the set-top box might comprise removing an application program and/or restoring (e.g., from an archive) the original version of the application. In other cases, the restoration might comprise rolling back patches, reconfiguring an application loader and/or links to original versions of applications. Restoring the set-top box can further comprise other operations appropriate to remove from the set-top box any modifications introduced by the test load.

In some aspects, the original (pre-test) configuration of the subscriber set-top box may be restored swiftly so that the user does not notice any delay in initiating the set-top box. For instance, the set-top box might be rebooted, and the bootloader instructed to boot the pre-existing version of the operating system. In some cases, however, there might be a slight delay for the testing to terminate and/or the configuration of the set-top box to be restored; in such cases, the set-top box might play a video clip (such as a video clip loaded with the test software), an image, a set of text, or the like to inform the user that full functionality of the set-top box will be available shortly.

If the testing did not successfully complete (e.g., because the set-top box was activated), the system might restart the test on a different set-top box. Accordingly, the test server might determine that another set-top box is inactive, and the process can repeat with the new set-top box, as shown by FIG. 2.

On the other hand, if the set-top box does not activate, and the testing is otherwise uninterrupted, the set-top box will continue to test the software until the testing regime has completed. At that point, the testing will conclude, and the method can comprise removing the loaded software and/or data and restoring the set-top box to is pre-test configuration (block 240b). In an aspect, this procedure can be similar to the procedure described above with respect to block 240a.

If the test ran to completion, the method 200 can include recording a test result (and, even if the test was interrupted, the system might record a result of "incomplete" or the like). The test result can take many forms. In some cases, the result might simply be a binary pass/fail value. In other cases, data generated by the software under test, or by a test harness used to perform the test, can be part of the test result. Those skilled in the art will appreciate the wide variety of test results that can be produced by set-top box testing, and any of such results can be recorded. In an aspect, recording the test result can comprise transmitting the result from the set-top box to the headend and/or the server (perhaps via the same path over which the data was provided from the server to the set-top box). In other aspects, recording the test result can comprise receiving the result at such a device, storing the result, analyzing the result and/or otherwise processing the result. In some cases, recording a test result might comprise consolidating test results received from a variety of different set-top boxes.

Figure 3:
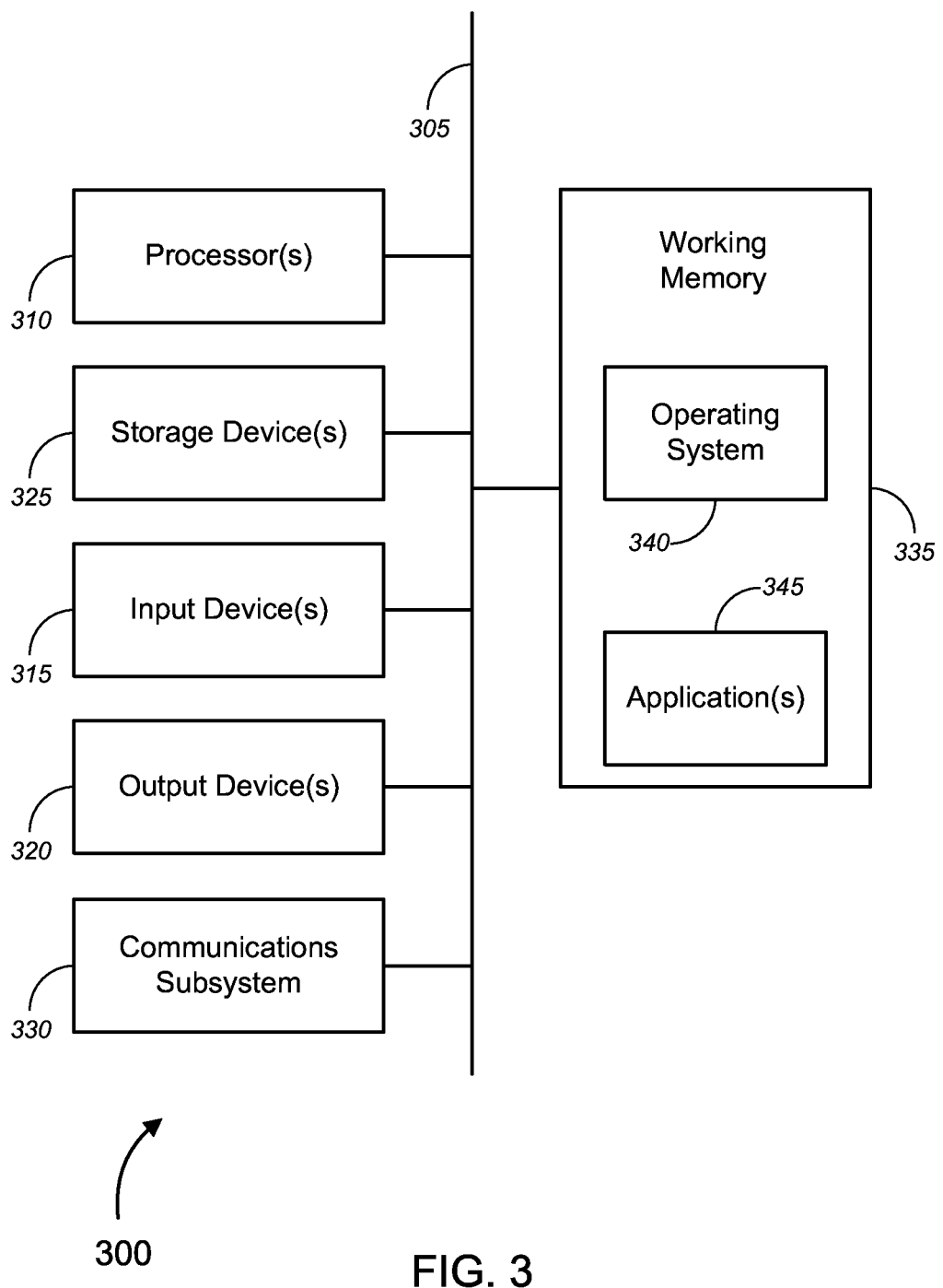
FIG. 3 is a generalized schematic diagram illustrating a computer system, in accordance with various embodiments.

FIG. 3 provides a schematic illustration of one embodiment of a computer system 300 that can perform the methods provided by various other embodiments, as described herein, and/or can function as a headend, test server, or set-top box. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 330 may permit data to be exchanged with a network (such as the network described below, to name one example), with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   connecting one or more servers with a group of subscriber set-top boxes through a television distribution network;
   selecting, by at least one of the one or more servers, a plurality of set-top boxes from the group of set-top boxes, wherein selecting a plurality of set-top boxes is based at least in part on a set-top box usage profile, and wherein the set-top box usage profile includes one or more times the set-top is likely to be inactive;
   determining, by at least one of the one or more servers, that at least one of the selected set-top boxes is inactive, wherein determining that the at least one of the selected set-top boxes is inactive comprises querying, by the at least one of the one or more servers performing such determination, a head-end of the television distribution network to determine which of the at least one of the selected set-top boxes is not currently receiving a first video stream;
   loading, by at least one of the one or more servers, data on the inactive set-top box, the data comprising an executable program;
   testing, by at least one of the one or more servers, the data on the inactive set-top box;
   recording, by at least one of the one or more servers, a test result;
   terminating, by at least one of the one or more servers, testing the data on the inactive set-top box in response to detecting that the inactive set-top box has become active and is currently receiving a second video stream;
   determining, by the at least one of the one or more servers, that the inactive set top box has become active and testing the data on the inactive set-top box was not completed; and
   based on a determination that the inactive set top box has become active and testing the data on the inactive set-top box was not completed, determining, by the at least one of the one or more servers testing the data, that a second set-top box of the selected set-top boxes is inactive, loading, by the at least one of the one or more servers loading the data to the second set-top box, and testing, by the at least one of the one or more servers testing the data, the data at the second set-top box.

2. The method of claim 1, further comprising:
   upon terminating testing, removing the data from the inactive set-top box; and
   restoring the set-top box to a pre-testing configuration for use by a subscriber.

3. The method of claim 1, wherein the data comprises a software update.

4. The method of claim 3, wherein testing the data comprises executing the software update.

5. The method of claim 1, wherein the data comprises an application.

6. The method of claim 1, wherein the data comprises an operating system for the inactive set-top box.

7. The method of claim 1, wherein the data causes a change in functionality of the inactive set-top box.

8. The method of claim 1, wherein the data causes a change to a graphical user interface of the inactive set-top box.

9. The method of claim 1, wherein selecting a plurality of set-top boxes is based at least in part on a user's profile associated with at least one of the plurality of set-top boxes.

10. The method of claim 1, wherein selecting a plurality of set-top boxes is based at least in part on geographic locations of the plurality of set-top boxes.

11. The method of claim 1, wherein selecting a plurality of set-top boxes is based at least in part on a device identifier of at least one of the plurality of set-top boxes.

12. The method of claim 1, further comprising receiving, at the at least one of the one or more servers testing the data, set-top box activity status information on a predetermined periodic basis.

13. The method of claim 1, further comprising:
   querying, with the one or more servers, at least some of the plurality of set-top boxes; and receiving, at the at least one of the one or more servers querying the at least some of the plurality of set-top boxes, activity status information in response to the query.

14. The method of claim 1, wherein the data comprises a video clip.

15. The method of claim 1, wherein testing the data comprises dual booting the set-top box with a bootloader.

16. The method of claim 1, further comprising:
based on a determination that the inactive set top box has become active displaying at least one of a video, an image, or text to inform a user that full functionality of the set-top box will be available shortly.

17. A system, comprising:
a processor;
a communication interface in communication with the processor; and
a non-transitory computer readable medium having encoded thereon a set of instructions executable by the processor, the set of instructions comprising:
instructions to connect, via the communication interface, with a group of subscriber set-top boxes through a television distribution network;
instructions to select a plurality of set-top boxes from the group of set-top boxes, wherein selecting a plurality of set-top boxes is based at least in part on a set-top box usage profile, and wherein the set-top box usage profile includes one or more times the set-top is likely to be inactive;
instructions to determine that at least one of the selected set-top boxes is inactive, wherein the instructions to determine that the at least one of the selected set-top boxes is inactive comprises instructions to query a head-end of the television distribution network to determine which of the at least one of the selected set-top boxes is not currently receiving a video stream;
instructions to load data on the inactive set-top box;
instructions to test the data on the inactive set-top box;
instructions to record a test result;
instructions to terminate testing the data on the inactive set-top box in response to detecting that the inactive set-top box has become active and is currently receiving a second video stream;
instructions to determine that the inactive set top box has become active and testing the data on the inactive set-top box was not completed; and
based on a determination that the inactive set top box has become active and testing the data on the inactive set-top box was not completed, instructions to determine that a second set-top box of the selected set-top boxes is inactive, instructions to load the data to the second set-top box, and instructions to test the data at the second set-top box.

18. A non-transitory computer readable medium having encoded thereon a set of instructions executable by a computer system, the set of instructions comprising:
instructions to connect with a group of subscriber set-top boxes through a television distribution network;
instructions to select a plurality of set-top boxes from the group of set-top boxes, wherein selecting a plurality of set-top boxes is based at least in part on a set-top box usage profile, and wherein the set-top box usage profile includes one or more times the set-top is likely to be inactive;
instructions to determine that at least one of the selected set-top boxes is inactive, wherein the instructions to determine that the at least one of the selected set-top boxes is inactive comprises instructions to query a head-end of the television distribution network to determine which of the at least one of the selected set-top boxes is not currently receiving a video stream;
instructions to load data on the inactive set-top box;
instructions to test the data on the inactive set-top box;
instructions to record a test result;
instructions to terminate testing the data on the inactive set-top box in response to detecting that the inactive set-top box has become active and is currently receiving a second video stream;
instructions to determine that the inactive set top box has become active and testing the data on the inactive set-top box was not completed; and
based on a determination that the inactive set top box has become active and testing the data on the inactive set-top box was not completed, instructions to determine that a second set-top box of the selected set-top boxes is inactive, instructions to load the data to the second set-top box, and instructions to test the data at the second set-top box.

* * * * *